June 6, 1961 G. S. HAUS 2,987,071
AIR PRESSURE CONTROL VALVE
Filed Jan. 17, 1958

INVENTOR.
Gerald S. Haus.
BY
William J. Ruano
ATTORNEY.

United States Patent Office 2,987,071
Patented June 6, 1961

2,987,071
AIR PRESSURE CONTROL VALVE
Gerald S. Haus, R.D. 3, Fleetwood, Pa.
Filed Jan. 17, 1958, Ser. No. 709,685
1 Claim. (Cl. 137—230)

This invention relates to a safety valve adapter and more particularly, to an adapter which may be screwed onto existing valve stems for pneumatic tires to convert them into safety valves which will prevent abnormal build up of air pressure.

An outstanding danger resulting from driving an automobile during hot weather is that roads become overheated, and combined with frictional heat resulting from driving for long periods of time, build up the air pressure in the tires to an abnormally high value such as to not only cause a hard and uncomfortable ride but actually tend to cause a blow out and resultant danger and injury. Abnormally high pressures also result from the use of faulty gages when tires are filled with air at service stations or by the vehicle operator.

Safety valves as such, for preventing abnormal build up of pressure, are known in the art. However, such safety valves are not adaptable for use in automobile tires for the reason that they are rather complicated and expensive in construction and necessitate rebuilding of the tire stem and core instead of permitting use of the conventional valve construction.

An object of my invention is to provide a novel safety valve adapter which can be easily attached to existing valve stems of vehicle tires and convert them into safety valves so as to prevent development of abnormally high pressures.

A more specific object of my invention is to provide a safety valve adapter which can be screw threaded onto a vehicle valve stem so as to limit the tire pressure to a predetermined safe and comfortable riding value, which adapter is very simple and inexpensive in construction.

Other objects and advantages of my invention will become apparent from a study of the following description taken along with the accompanying drawing wherein.

Figure 1:
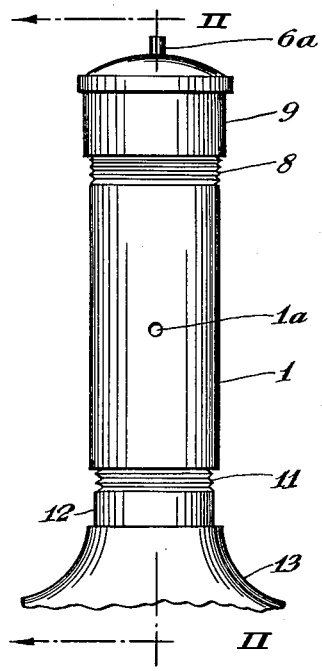
FIG. 1 is an elevational view of a safety valve adapter embodying the principles of my invention.

Referring more particularly to the drawing, numeral 1 denotes an adapter valve body or tube which is of a construction similar to the stem of a conventional valve for a pneumatic tube or tire of an automobile. Body 1 has an internally threaded portion 11 of a conventional valve stem 10. Numeral 2 denotes a fiber washer, or other type of washer, for providing an air-tight seal between the valve stem 10 and adapter body 1. A valve core 12 is contained within the conventional stem 10 integral with inner tube or tire 13, which core is spring biased outwardly, in a well known manner, to normally close the valve.

A somewhat conically shaped valve seat 3a is formed in the interior of adapter body 1, upon which is seated a ball 3 which rests on top of follower 4 of cylindrical shape which is slidable in a correspondingly shape bore formed in a bottom wall of body 1. A spherical segment or seat is formed on top of the follower rod 4 to closely fit the ball 3. The bottom end of the follower is adapted to rest upon the valve core 12 to release the air from the tire. The air from the tire will flow through openings formed in the outer side of follower rod 5 and extending axially thereof so as to communicate with the interior of the adapter body when ball valve 3 becomes unseated.

Normally, however, the valve ball 3 is maintained in the seated position, as shown, so as to prevent passage of air from the tire to the interior of the adapter body 1. This seating is effected by means of a piston-like collar 6 formed on the bottom end of stem 6a, which collar is normally held downwardly by means of a helical spring 7. The lower end of collar 6 is in the form of a spherical, segmental seat shaped to closely fit onto the top of ball 3. The lower end of the spring 7 rests on collar 6 whereas the top end is adjustably moved to different vertical positions by unscrewing a cap 9 so as to vary the amount of compression of the spring and thus vary the value of the pressure necessary for unseating ball 3 by overcoming the seating tendency of spring 7.

Figure 2:
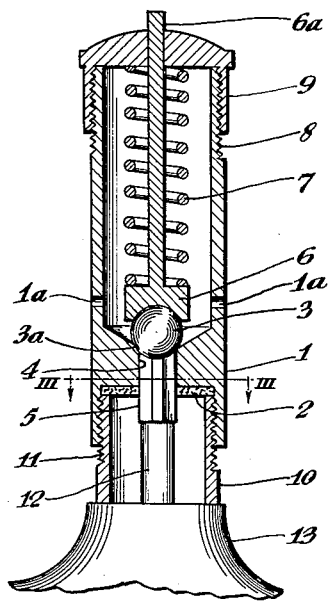
FIG. 2 is a vertical cross-sectional view taken along line II—II of FIG. 1.
Figure 3:
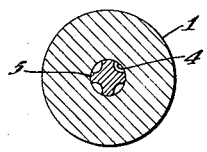
FIG. 3 is a sectional view taken along line III—III of FIG. 2.

In operation, therefore, when normal pressures are existent in the tire, ball 3 will be yieldably held in the closed position, as shown, by means of spring 7 to prevent escape of air from the tire. However, when a predetermined abnormally high pressure is reached, such as the result of sustained driving on hot summer days, the pressure inside the tire will overcome the action of spring 7 and will unseat ball 3, therefore allowing sufficient escape of air from the tire, through the openings in follower 5 and into valve adapter body 1 and outside thereof through ports 1a, exhausting into the surrounding atmosphere. This escape of air will continue until the tire pressure has been lowered to a predetermined safe value at which time the ball 3 will become reseated because of the ability of spring 7 to overcome the air pressure exerted on ball 3 and keep it seated. Of course, the amount of pressure necessary for unseating the ball can be regulated by selectively screwing or unscrewing the cap 9. FIG. 2 shows cap 9 screwed down for maximum high pressure. Of course, cap 9 may be eliminated and the top of body 1 made integral in case that it is not desired to make the pressure adjustable.

It should be understood that the adapter body 1 may be attached directly to an inner tube or tire, instead, that is, it may take the place of the stem 10 in the case of a new inner tube or tire construction with built-in safety features, as distinguished from an adapter for screwing onto an existing conventional type valve. For such modification, of course, washer 2 may be eliminated.

Thus it will be seen that I have provided an efficient safety valve adapter which can be screw-threaded onto existing valve stems for automobile tubes or tires and which will impart, to the valves, a safety feature, effecting the release of abnormally high pressures developed as the result of sustained driving during extremely hot summer, or the like, including means for easily adjusting the value of the pressure by simply turning a screw cap; furthermore I have provided a safety valve which is of relatively simple and inexpensive construction and which may be easily and quickly installed or removed as required.

While I have illustrated and described a single specific embodiment of my invention, it will be understood that this is by way of illustration only, and that various changes and modifications may be made within the contemplation of my invention and within the scope of the following claim.

I claim:

A safety adapter for an automobile tire valve for regulating tire pressure, said adapter comprising a tubular body having a lower internally threaded skirt portion for screwing onto the stem of a tire valve and having an upper externally threaded portion, a cup-shaped cap having a central hole and being internally threaded for screw threadedly engaging said upper portion, said body having an integral bottom wall having a conical valve seat and a central bore therethrough, said body also having a hole to allow escape of air, a ball resting on said seat so as to close said bore, a piston-like element movable axially within said body and having a spherically seated bottom end portion against which said ball is seated and having a top end portion slidably fitted in and guided by said central hole in said cap, a valve engaging element slidably fitted in said bore, said slidable element having longitudinally extending, circumferentially spaced grooves providing air communication through said bore and having a spherical seat receiving said ball, a helical spring surrounding said top end portion of the piston-like element and having one end seated against the interior surface of said cap and the other end seated against the upper surface of the piston-like element bottom end portion, whereby upon attainment of a predetermined pressure in said skirt portion said ball will be unseated to allow escape of air through said hole in said body and whereby upon turning of said cap the pressure required for unseating the ball may be selectively varied.

References Cited in the file of this patent

UNITED STATES PATENTS

| | | |
|---|---|---|
| 837,772 | Arnold | Dec. 4, 1906 |
| 1,239,022 | McClean | Sept. 4, 1917 |
| 1,896,052 | Ferris | Jan. 31, 1933 |
| 2,001,686 | Moore | May 14, 1935 |

FOREIGN PATENTS

| | | |
|---|---|---|
| 22,361 | Great Britain | Dec. 6, 1892 |
| 482,523 | Italy | July 6, 1953 |